United States Patent [19]

Roberts

[11] Patent Number: 4,535,755
[45] Date of Patent: Aug. 20, 1985

[54] SOLAR ENERGY COLLECTOR

[76] Inventor: Griffith T. Roberts, Maes yr Haul, Cross Inn, Llantrisant, Mid-Glamorgan, Wales

[21] Appl. No.: 586,360

[22] Filed: Mar. 5, 1984

[30] Foreign Application Priority Data

Mar. 5, 1983 [GB] United Kingdom ............... 8306016

[51] Int. Cl.³ .............................................. F24J 3/02
[52] U.S. Cl. ..................................... 126/443; 126/450
[58] Field of Search ....................... 126/443, 442, 450

[56] References Cited

U.S. PATENT DOCUMENTS 4,153,042 5/1979 Tragert ................................ 126/443
4,198,955 4/1980 Dorbeck ............................. 126/443
4,270,524 6/1981 Bächli ................................. 126/443

Primary Examiner—William E. Lyddane
Assistant Examiner—Gerald A. Anderson
Attorney, Agent, or Firm—Young & Thompson

[57] ABSTRACT

A solar energy collector comprises a central metal manifold 10 with five separate glass vacuum vessels 11,12 positioned on opposite sides and offset or staggered, the vessels being sealed to the manifold plate 16 while a continuous metal conduit 13 extends in a zig zag continuous looped path from end to end through all the vessels. This provides continuous vacuum communication between all the vessels and there is no need for vacuum seals where the conduit passes through the manifold except at the two end seals 18,19.

5 Claims, 6 Drawing Figures

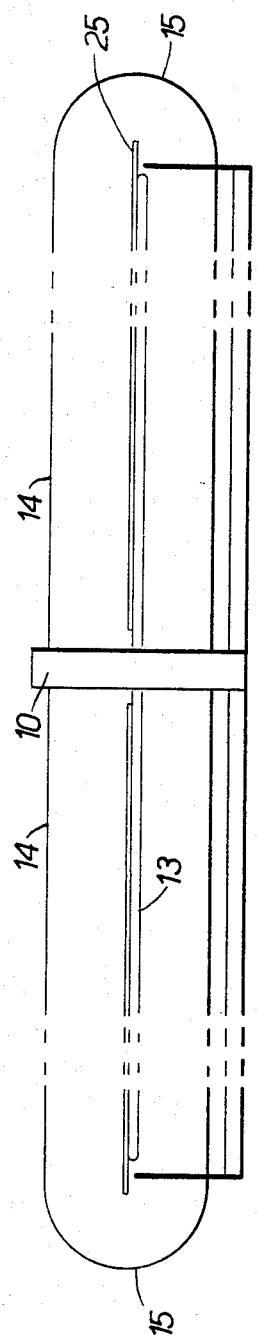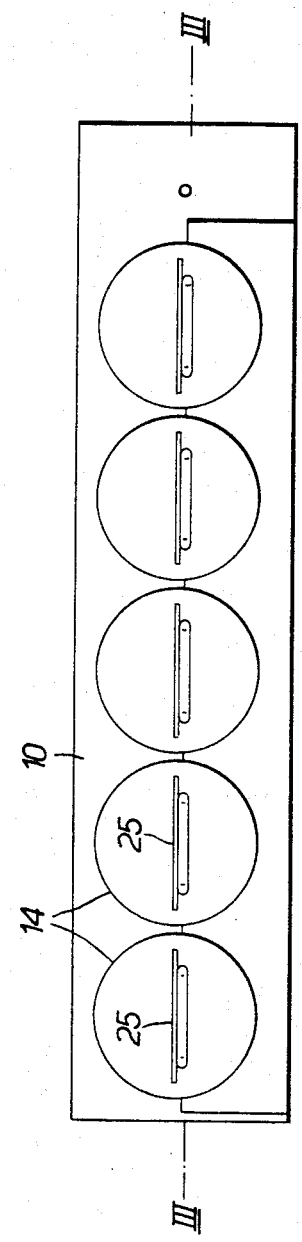

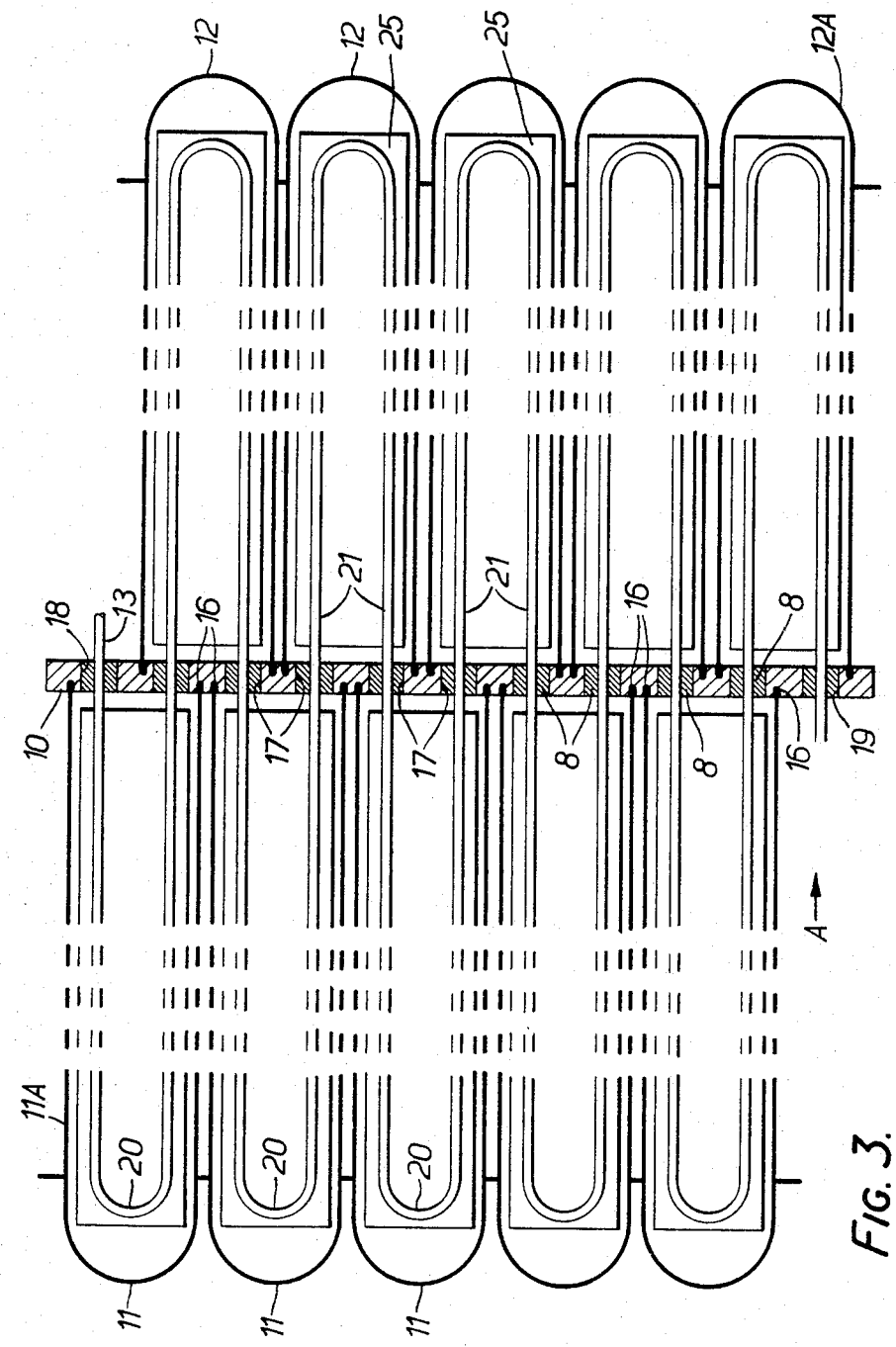

U.S. Patent  Aug. 20, 1985  Sheet 3 of 3  4,535,755
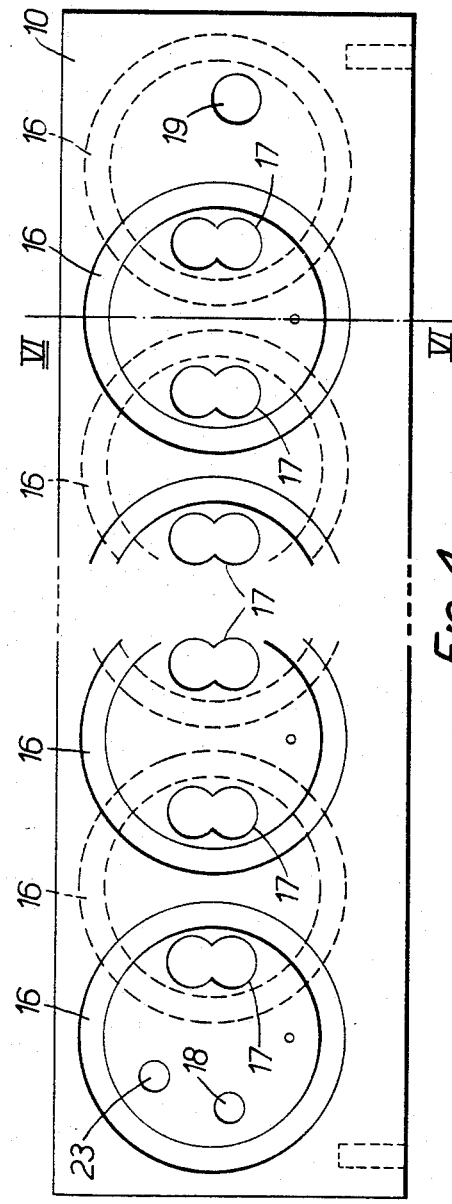
FIG. 4.
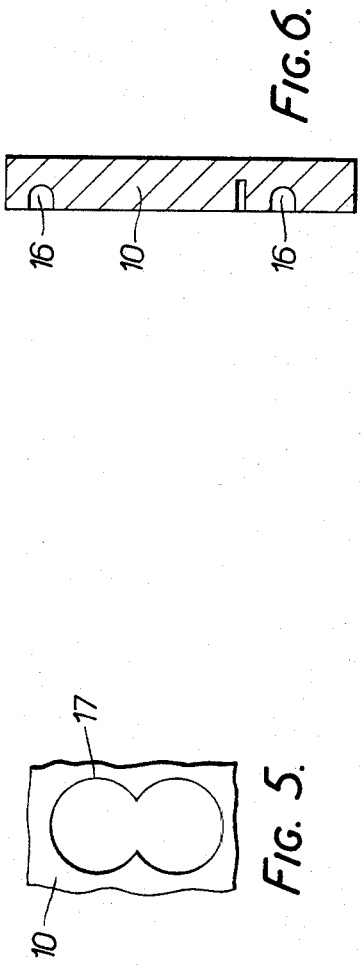
FIG. 6.
FIG. 5.

SOLAR ENERGY COLLECTOR

This invention relates to a solar energy collector of the vacuum type that is to say having an energy collecting surface located within a vacuum vessel. The term "vacuum" as used herein is of course intended to refer to a partial vacuum as well as a total vacuum.

In general, evacuated solar collectors are of two types, either single walled or double walled. In the single walled type the interior of each tube is evacuated and this requires an effective vacuum seal between the tube and the base or supporting member. In the second type the vacuum exists between the two walls or each vessel as in a conventional thermos flask and each vessel is permanently sealed and the interior need not be evacuated. Vacuum seals at the end of each tube may therefore not be required. The two types of tubes have totally different manufacturing problems and their advantages and disadvantages are likewise completely different. For example, if the interior of a double walled tube is open to the atmosphere there is no need for a vacuum seal around the fluid conducting tube.

Existing collectors of the vacuum type suffer from many problems and disadvantages. If the walls of the vacuum chamber are formed of glass it is necessary to provide efficient vacuum seals between the glass and any metal conduit through which a heat exchange medium flows into and out of the vacuum vessel. To form effective long lasting glass-to-metal vacuum seals is a laborious and expensive operation and in existing collectors these sectors of the equipment also tend to result in considerable heat losses which reduce the overall efficiency.

It has been proposed to use synthetic polymer seals to reduce sealing costs, but even the best polymer sealing materials will allow small amounts of gas to enter the vessel. Therefore it has been also proposed to introduce into the vessel a low thermal conductivity gas at a suitable pressure, such that the effect of the gas entering from the seal material is negligible. With existing collector designs however each vessel would need a seal for the heat exchange fluid conduit as well as a seal for the vessel open end.

It is therefore an object of the invention to provide an improved solar energy collector which will simplify manufacturing operations, reduce costs and increase overall efficiency.

Broadly stated the invention consists in a solar energy collector, comprising a plurality of separately formed vacuum vessels each having a wall which is capable of transmitting solar energy, the vessels being interconnected to provide a continuous vacuum path through the vessels, and a conduit for a heat exchange medium extending through all the vessels along the vacuum path.

According to a preferred feature of the invention each vessel is closed at one end and sealed to an adjacent member at the other end, and the conduit extends into and out of the vessel through apertures in the member. The vessels are preferably positioned on and sealed to a manifold base, some vessels on one side and others on the opposite side of the base, and the base has apertures to accommodate the conduit which extends in a zig-zag path having a loop within each of the vessels.

According to another preferred feature of the invention the vessels each have one closed end, and one open end, and are positioned with their open ends adjacent one another, staggered, and partly overlapping, and the conduit passes directly from one vessel into the next.

The vessels are preferably formed of glass which may be inexpensive soda glass which has good light and heat transmitting properties and is long-lasting, comparatively tough, and amenable to sealing by a synthetic polymer. The open ends of the vessel may be sealed in various ways, but conveniently by means of an elastomeric or polymeric sealing substance.

In a preferred construction the vessels are mounted on and vacuum sealed to a metal manifold, which has apertures through which the conduit passes from one vessel to the next without vacuum seals. The conduit preferably extends from one end of the vacuum path to the other without leaving the vacuum environment, and without passing through a vacuum seal.

The invention may be performed in various ways and one specific embodiment will now be described by way of example with reference to the accompanying drawings, in which:

FIG. 1 is a diagrammatic side view of a solar energy collector according to the invention, FIG. 2 is an end view thereof, FIG. 3 is a sectional plan view on the line III—III in FIG. 2, FIG. 4 is an end view of the central manifold seen in the direction of arrow A in FIG. 3, FIG. 5 is an enlarged view of one of the apertures in the manifold, and FIG. 6 is a cross-section on the line VI—VI in FIG. 4.

In this example the energy collector comprises a central metal manifold 10 in the form of an elongated generally flat metal plate with five individually formed glass vacuum vessels 11,12 located on opposite sides. The individual vessels are sealed to the manifold plate as will be described and a continuous metal fluid conduit 13 extends in a zig-zag looped path from end to end through all the vessels.

Each vacuum vessel 11,12 has a cylindrical glass body 14 with a part spherical domed end 15 designed for maximum strength and to resist atmospheric pressure. The opposite open end of the vessel is received in a corresponding circular groove 16 formed in the respective face of the manifold plate. The lip of the glass vacuum vessel is sealed in this groove by means of a vacuum-quality elastomeric sealing material such as the polymer sold under the Trade Mark VITRON by Dupont, or that sold under the Trade Mark FLOUREL by 3M U.K. PLC. This provides an effective long-life seal without the delicate expensive operations required for a direct vacuum glass-to-metal seal. It will be seen from FIGS. 3 and 4 that the vacuum vessels on opposite sides of the manifold plate 10 are offset and staggered and so arranged that the vessels partially overlap at their ends with the ends of two vessels on opposite sides of the plate. The manifold plate is formed with through apertures 17 at each of these points of overlap and also with inlet and exit apertures 19 at opposite ends where the end vessels 11a,12a only overlap with one other vessel. This arrangement of apertures through the manifold plate affords a continuous vacuum communication between all the vessels of the collector. Heat is removed and transferred from the collector by means of a heat exchange medium flowing through the zig-zag fluid conduit 13, which is formed with loops 20 extending into each of the vessels, the straight sections 21 passing directly through the apertures 17 in the manifold plate.

These apertures may be provided with fillers or spacers 8 simply to locate the fluid conduit physically in position, but without acting as vacuum seals. The apertures 18,19 at the remote ends of the manifold plate are provided with full vacuum grade sealing material to ensure that the overall vacuum is preserved within the collector. Conveniently an additional aperture 23 is provided for connection to a vacuum pump to evacuate the whole system after assembly.

Collector plates 25 are preferably positioned within each vessel and preferably spanning across the loop of the fluid conduit and connected to the loop in good thermal contact. Each collector plate may be coated with a suitable black selective receiver paint or coating and the angular attitude of the collector plates may be varied to suit individual applications and locations.

In the assembly process the fluid conduit 13 with its multiple loops is first threaded through the openings in the manifold 10. This may require that individual loops are prefabricated and then joined in a permanent vacuum type manner by brazing or other means. The collector plates 25 are positioned and the packing pieces 8 inserted in the openings 17 and the vacuum seals installed at the end apertures 18,19. Subsequently the glass vacuum vessels are positioned one over each of the conduit loops, offered up to the manifold plate, and sealed into the respective groove 16, as explained above. The whole system is then evacuated through the aperture 23, which is finally closed permanently.

It will be seen therefore that there are only two vacuum seals needed for the whole length of the fluid conduit and the advantages of glass vacuum vessels are utilised without the normal problems and disadvantages of glass-to-metal seals. Heat losses are minimised and the overall efficiency is greatly improved.

It will be appreciated that certain variations in the overall design are possible. For example, there may be two separate spaced manifold plates with vacuum vessels as described on their outer remote faces and straight tubular vessels open at both ends positioned between the two manifold plates, again providing a continuous vacuum path from end to end for the fluid conduit. Each vessel may be a double walled Dewar flask the space between the walls being evacuated. The interiors of the vessels may be occupied by a rarified gas of low thermal conductivity at partial vacuum, i.e., sub-atmospheric pressure.

I claim:

1. A solar energy collector, comprising a manifold base, a plurality of separately formed vacuum vessels positioned on and sealed to said manifold base, each said vessel having a wall which is capable of transmitting solar energy, the interiors of said vessels being interconnected via passages through said base to provide a continuous vacuum path through the vessels, and a conduit for a heat exchange medium extending in a zig zag path through said manifold base, and within each of said vessels and in which the vessels each have one closed end, and the other ends of said vessels are sealed to said manifold base, some of said vessels being disposed on one side of said base and others of said vessels being disposed on the other side of said base, the vessels on one side of said base being staggered and partly overlapping the vessels on the other side of said base, and said conduit passes directly from one vessel on one side of said base into the next adjacent vessel on the other side of said base.

2. A collector according to claim 1, in which each vessel is closed at one end and sealed to said manifold base at the other end, and said conduit extends in a loop into and out of each vessel through apertures in said base.

3. A collector according to claim 1, in which the vessels are formed of glass, and the manifold base is metallic, and the open ends of the vessels are sealed to said manifold base by means of an elastomeric sealing substance.

4. A collector according to claim 1, in which said base has apertures through which said conduit passes from one vessel to the next without vacuum seals.

5. A collector according to claim 1, in which the conduit extends from one end of the vacuum path to the other without leaving the vacuum environment, and without passing through an intermediate vacuum seal.

* * * * *